(12) United States Patent
Noda et al.

(10) Patent No.: US 10,254,138 B2
(45) Date of Patent: Apr. 9, 2019

(54) DISPLAY GENERATING DEVICE, DISPLAY CONTROL DEVICE, AND DISPLAY GENERATING METHOD

(71) Applicant: MITSUBISHI HEAVY INDUSTRIES, LTD., Tokyo (JP)

(72) Inventors: Eisuke Noda, Tokyo (JP); Satoshi Hanada, Tokyo (JP); Yusuke Yamada, Tokyo (JP); Mizuki Kasamatsu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/562,771

(22) PCT Filed: Mar. 25, 2016

(86) PCT No.: PCT/JP2016/059697
§ 371 (c)(1),
(2) Date: Sep. 28, 2017

(87) PCT Pub. No.: WO2016/158784
PCT Pub. Date: Oct. 6, 2016

(65) Prior Publication Data
US 2018/0120131 A1    May 3, 2018

(30) Foreign Application Priority Data
Mar. 31, 2015   (JP) .................. 2015-073948

(51) Int. Cl.
*G06T 11/00* (2006.01)
*G21C 17/00* (2006.01)
(Continued)

(52) U.S. Cl.
CPC ............... *G01D 7/02* (2013.01); *G06Q 10/06* (2013.01); *G06Q 10/067* (2013.01); *G06Q 50/06* (2013.01); *G06T 11/001* (2013.01); *G21C 17/00* (2013.01)

(58) Field of Classification Search
USPC ......................................... 345/593
See application file for complete search history.

(56) References Cited

U.S. PATENT DOCUMENTS

2013/0268196 A1   10/2013   Dam
2015/0213377 A1    7/2015   Ito et al.
(Continued)

FOREIGN PATENT DOCUMENTS

EP           2840577 A1    2/2015
JP        2002-245314 A    8/2002
(Continued)

OTHER PUBLICATIONS

Extended European Search Report in EP Application No. 16772665.2, dated Mar. 13, 2018. 10pp.
(Continued)

*Primary Examiner* — Wesner Sajous
(74) *Attorney, Agent, or Firm* — Hauptman Ham, LLP

(57) ABSTRACT

A display generating device includes an acquiring unit configured to acquire multiple pieces of event data, each of which being provided with time information and identification information indicating which one of multiple categories related to a facility the event data belongs to, and a generating unit configured to generate display data by arraying the multiple pieces of the event data in time series based on the time information for each of the categories depending on the identification information.

14 Claims, 10 Drawing Sheets

(51) Int. Cl.
  *G01D 7/02*    (2006.01)
  *G06Q 10/06*   (2012.01)
  *G06Q 50/06*   (2012.01)

(56) References Cited

U.S. PATENT DOCUMENTS

| | | | |
|---|---|---|---|
| 2015/0223731 A1* | 8/2015 | Sahin | A61B 5/16 600/301 |
| 2015/0264547 A1 | 9/2015 | Kobayashi | |
| 2017/0064014 A1* | 3/2017 | Nomura | G06Q 10/06311 |
| 2017/0220938 A1* | 8/2017 | Sainani | G06N 5/04 |
| 2017/0262697 A1* | 9/2017 | Kaps | A63F 13/00 |
| 2018/0084310 A1* | 3/2018 | Katz | H04N 21/2187 |
| 2018/0089561 A1* | 3/2018 | Oliner | G06N 3/08 |

FOREIGN PATENT DOCUMENTS

| | | |
|---|---|---|
| JP | 2003-177666 A | 6/2003 |
| JP | 2006-292402 A | 10/2006 |
| JP | 2008-77292 A | 4/2008 |
| JP | 2010-56979 A | 3/2010 |
| JP | 2011-210205 A | 10/2011 |
| JP | 2012-43056 A | 3/2012 |
| JP | 2013-88829 A | 5/2013 |
| JP | 2014-59641 A | 4/2014 |
| JP | 2014-78070 A | 5/2014 |
| JP | 2014-81857 A | 5/2014 |
| WO | 2014/057835 A1 | 4/2014 |

OTHER PUBLICATIONS

Written Opinion of the International Searching Authority in International patent application No. PCT/JP2016/059697, dated Jun. 21, 2016. 11pp.

International Search Report in PCT/JP2016/059697, dated Jun. 21, 2016. 6pp.

\* cited by examiner

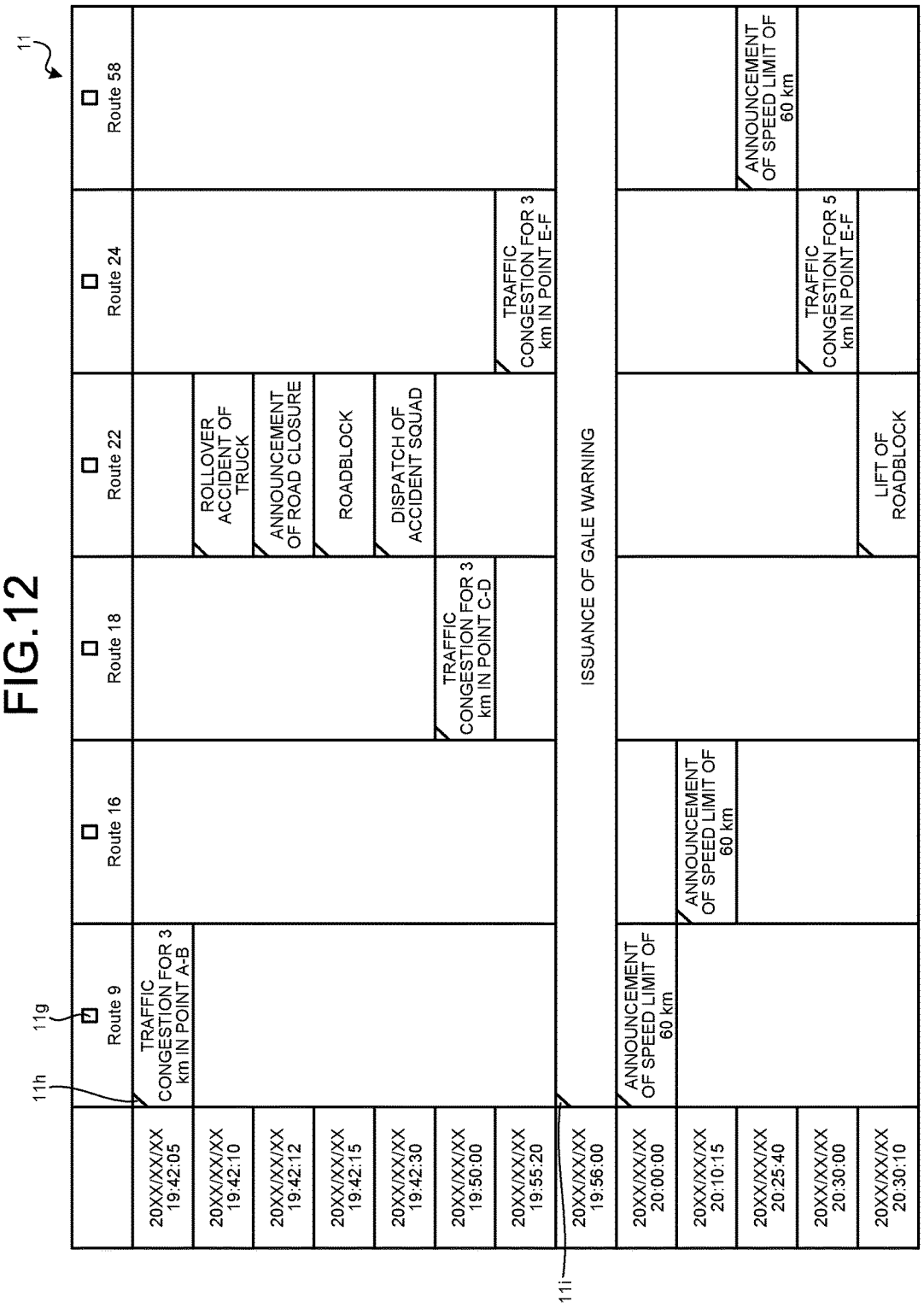

DISPLAY GENERATING DEVICE, DISPLAY CONTROL DEVICE, AND DISPLAY GENERATING METHOD

CROSS-REFERENCE TO RELATED APPLICATION

This application is a National Stage of International Application Number PCT/JP2016/059697, filed Mar. 25, 2016, which claims priority to Japanese Application Number 2015-073948, filed Mar. 31, 2015.

FIELD

The present invention relates to a display generating device, a display control device, and a display generating method for displaying, for example, events that change every moment in a plant at the time of an emergency.

BACKGROUND

For example, a nuclear power plant includes a reactor, a steam turbine, a power generator, and the like. When a pressurized water reactor (PWR) is applied as the reactor, the pressurized water reactor uses light water as a reactor coolant and a neutron moderator to generate high-temperature and high-pressure water that does not boil in the whole reactor internal. A steam generator exchanges heat between the high-temperature and high-pressure water (primary coolant water) and secondary coolant water to generate steam. The steam turbine is driven with the generated steam and the power generator generates power with resultant driving force.

When a severe accident occurs in such a nuclear power plant, a disaster response office needs to be provided at various places to know situation of the accident and to take measures. Generally, many persons concerned are called to the disaster response offices, where information required for directions and orders on plant status assessments and a countermeasure flow is presented.

For example, Japanese Patent Application Laid-open No. 2014-078070 and International Publication No. WO2014/057835 describe typical decision-making support systems. For example, the decision-making support system described in Patent Literature 1 detects events that become factors of a decision making using an event managing unit, and determines task allocation and information to be informed corresponding to the events using a correlative relationship of respective pieces of information managed according to the events by an information-correlation managing unit in order to distribute information required for making decisions from a decision-making support device to various terminals via a network. Japanese Patent Application Laid-open No. 2006-292402, Japanese Patent Application Laid-open No. 2011-210205 and Japanese Patent Application Laid-open No. 2003-177666 also describe techniques that enable to manage information at the time of a disaster.

SUMMARY

When a severe accident occurs in a plant, events that change every moment are reported and it is expected that these events are collectively grasped.

A display generating device, a display control device and display generating method are disclosed.

According to one aspect of the present application, there is provided a display generating device comprising: an acquiring unit configured to acquire multiple pieces of event data, each of which being provided with time information and identification information indicating which one of multiple categories related to a facility the event data belongs to; and a generating unit configured to generate display data by arraying the multiple pieces of the event data in time series based on the time information for each of the categories depending on the identification information.

According to the display generating device, pieces of event data of various events are acquired and display data where the pieces of the event data are arrayed in time series for each of categories is generated. Therefore, reports on the various events can be aggregated. Accordingly, an operator can confirm the various events in time series with respect to each category. As a result, the event data of the various events can be managed in a lump and can be presented to the operator with no omission.

According to one aspect of the present application, when one piece of the event data is common to the multiple categories, the generating unit preferably generates the display data in such a manner that the piece of the event data extends across the multiple categories.

According to the display generating device, pieces of the event data common to multiple categories are displayed as display data extending across the categories. Therefore, the visibility is enhanced and contents of reports can be emphasized as compared to a case where the pieces of the event data are displayed as individual pieces of display data.

According to one aspect of the present application, the generating unit preferably generates the display data in such a manner that the display data is displayed where a corner of a frame of the display data extending across the multiple categories is colored with a different color from those of the multiple categories.

According to the display generating device, when display data extending across the categories is generated, the display data is generated with the corner of the frame of the display data extending across the categories being colored with a different color from those of the respective categories. Therefore, common event data can be displayed distinctively by being separately color-coded.

According to one aspect of the present application, when pieces of the event data are common to the multiple categories, the generating unit preferably generates the display data by aggregating the respective pieces of the event data in a common category.

According to the display generating device, when there are pieces of the event data common to multiple categories, display data is generated by aggregating these pieces of the event data into another category. Therefore, the event data can be seen from a different viewpoint and report contents can be emphasized.

According to one aspect of the present application, the acquiring unit preferably acquires only preset pieces of the event data.

According to the display generating device, when there are many reports, display data generated from preset event data, for example, the event data with a high importance degree is displayed on a display unit. Therefore, the visibility can be improved and report contents can be emphasized.

According to one aspect of the present application, the generating unit preferably includes a classifying unit configured to divide the multiple pieces of the event data into at least two groups based on a predetermined standard and an aggregating unit configured to aggregate pieces of the event data included in a specific one of the at least two classified groups into one unit as time passes.

According to the display generating device, for example, pieces of the event data with a low importance degree are aggregated as time passes and are displayed in a compact state while pieces of the event data with a high importance degree are displayed as they are. Therefore, the visibility is enhanced and report contents with a high importance degree can be emphasized.

According to one aspect of the present application, when the acquiring unit acquires updated event data, the generating unit preferably generates the display data based on the updated event data.

When the event data is input by a person, erroneous inputs may occur. According to the display generating device, when an erroneous input is corrected and the event data is updated, the updated event data is acquired and display data reflecting the update is generated. Therefore, correct report contents can be displayed.

According to one aspect of the present application, when the acquiring unit acquires prediction data predicting a subsequent event, the generating unit preferably generates the display data based on the prediction data.

According to the display generating device, for example, when subsequent events are predicted by simulation, these events are acquired as prediction data and display data predicting the subsequent events is generated. Therefore, prediction of the subsequent events can be seen in time series.

According to one aspect of the present application, when the acquiring unit acquires plan data previously scheduled, the generating unit preferably generates the display data based on the plan data.

According to the display generating device, deviation from current progress can be recognized, items to be handled hereafter can be known, and allowable time therefor can be recognized at a glance. A planned schedule can be revised by a drill or the like according to actual handling and becomes a plan with higher accuracy as the schedule is implemented more.

According to one aspect of the present application, when the acquiring unit acquires work data of a work corresponding to the event data, the generating unit preferably generates the display data based on the work data.

According to the display generating device, works of countermeasures for the event data can be confirmed.

According to one aspect of the present application, the acquiring unit preferably acquires the event data from multiple places via a network.

According to the display generating device, pieces of the event data at multiple places are acquired, and display data where the pieces of the event data are arrayed in time series for each of the categories is generated and displayed on the display unit. Therefore, the event data at multiple places can be collectively displayed.

According to one aspect of the present application, there is provided a display control device comprising the display generating device described above and a display control unit configured to execute control to display the display data generated by the display generating device on a display unit.

According to the display control device, pieces of event data of various events are acquired and display data where the pieces of the event data are arrayed in time series for each of categories is generated and displayed on the display unit. Therefore, reports on the various events can be aggregated. Accordingly, an operator can confirm the various events in time series for each of the categories. As a result, the event data of the various events can be managed in a lump and can be presented to the operator with no omission.

According to one aspect of the present application, the display control unit preferably executes the control to array the categories on a horizontal axis and display the display data on a vertical axis in time series based on the time information for each of the categories on the display unit.

According to the display control device, the display data is displayed on the vertical axis in time series. Therefore, reports on events of the respective categories can be displayed sequentially from top to bottom.

According to one aspect of the present invention, there is provided a display generating method comprising acquiring multiple pieces of event data, each of which being provided with time information and identification information indicating which one of multiple categories related to a facility the event data belongs to, and generating display data by arraying the multiple pieces of the event data in time series based on the time information for each of the categories depending on the identification information.

According to the display generating method, pieces of event data of various events are acquired and display data where the pieces of the event data are arrayed in time series for each of categories is generated. Therefore, reports on the various events can be aggregated. This enables an operator to confirm the various events in time series for each of the categories. As a result, the event data of the various events can be managed in a lump and can be presented to the operator with no omission.

According to the present application, it is possible to aggregate reports on various events.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 12 is a schematic diagram illustrating a display example of the display control device according to the embodiment of the present invention.

DETAILED DESCRIPTION OF THE PREFERRED EMBODIMENTS

Exemplary embodiments of a display generating device, a display control device, and a display generating method according to the present invention will be explained in detail below with reference to the accompanying drawings. The present invention is not limited to the embodiments, and when there are multiple embodiments, embodiments formed by combining the respective embodiments are also included in the present invention.

Figure 1:
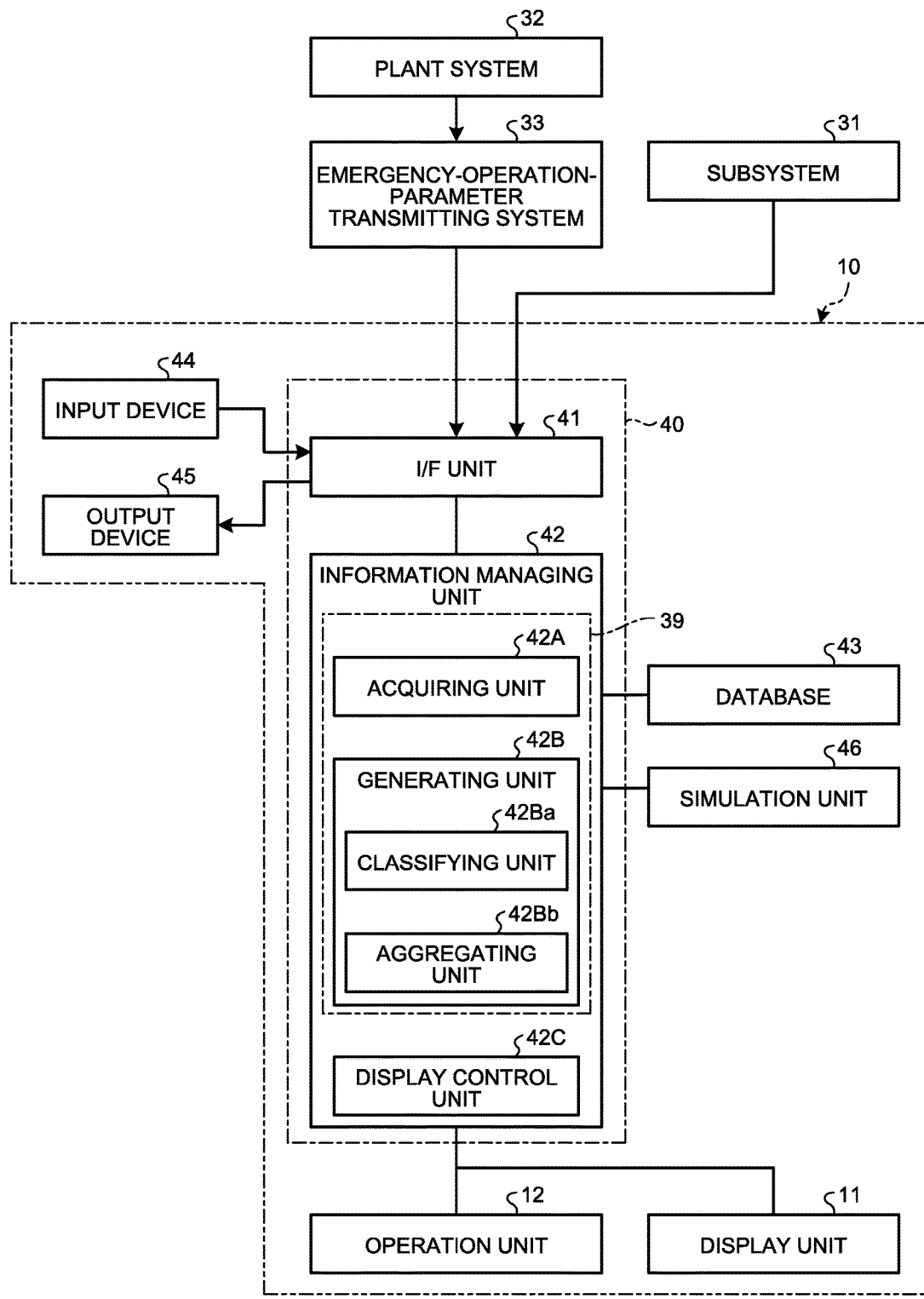
FIG. 1 is a schematic configuration diagram illustrating a display control system including a display control device according to an embodiment of the present invention.
Figure 2:
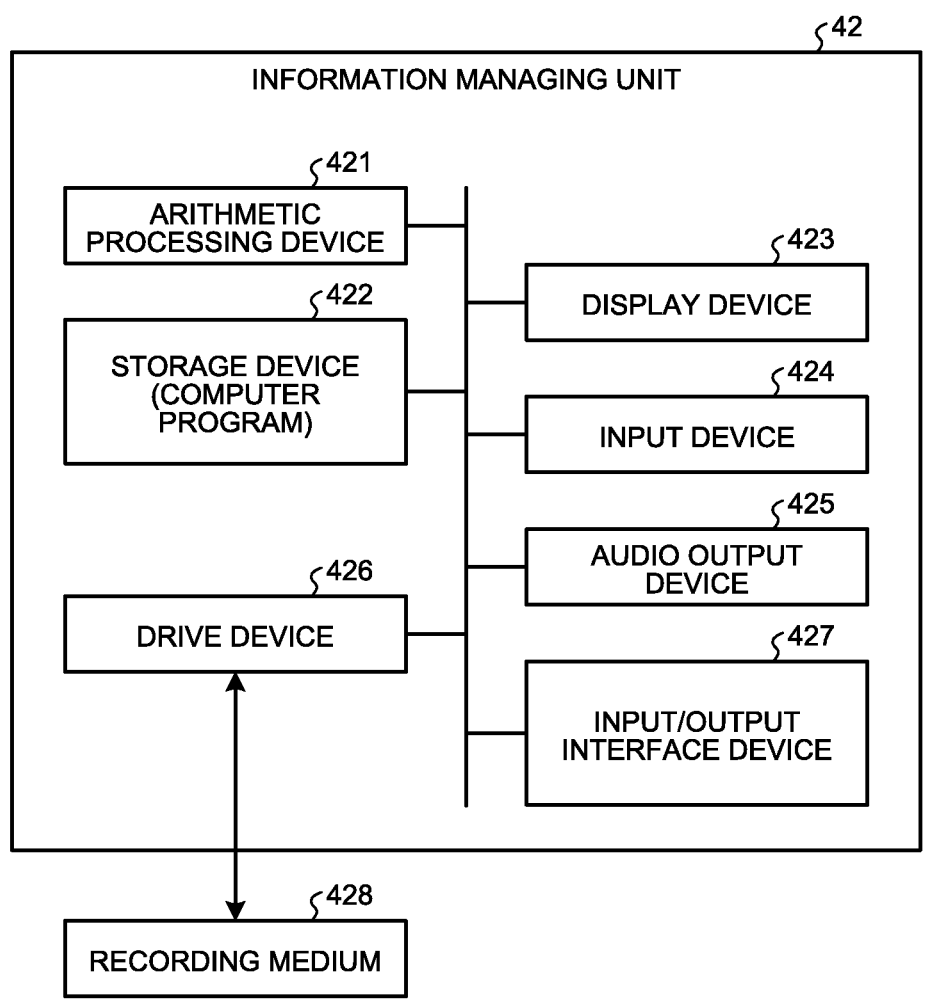
FIG. 2 is a schematic configuration diagram of an information managing unit in the display control device according to the embodiment of the present invention.
Figure 3:
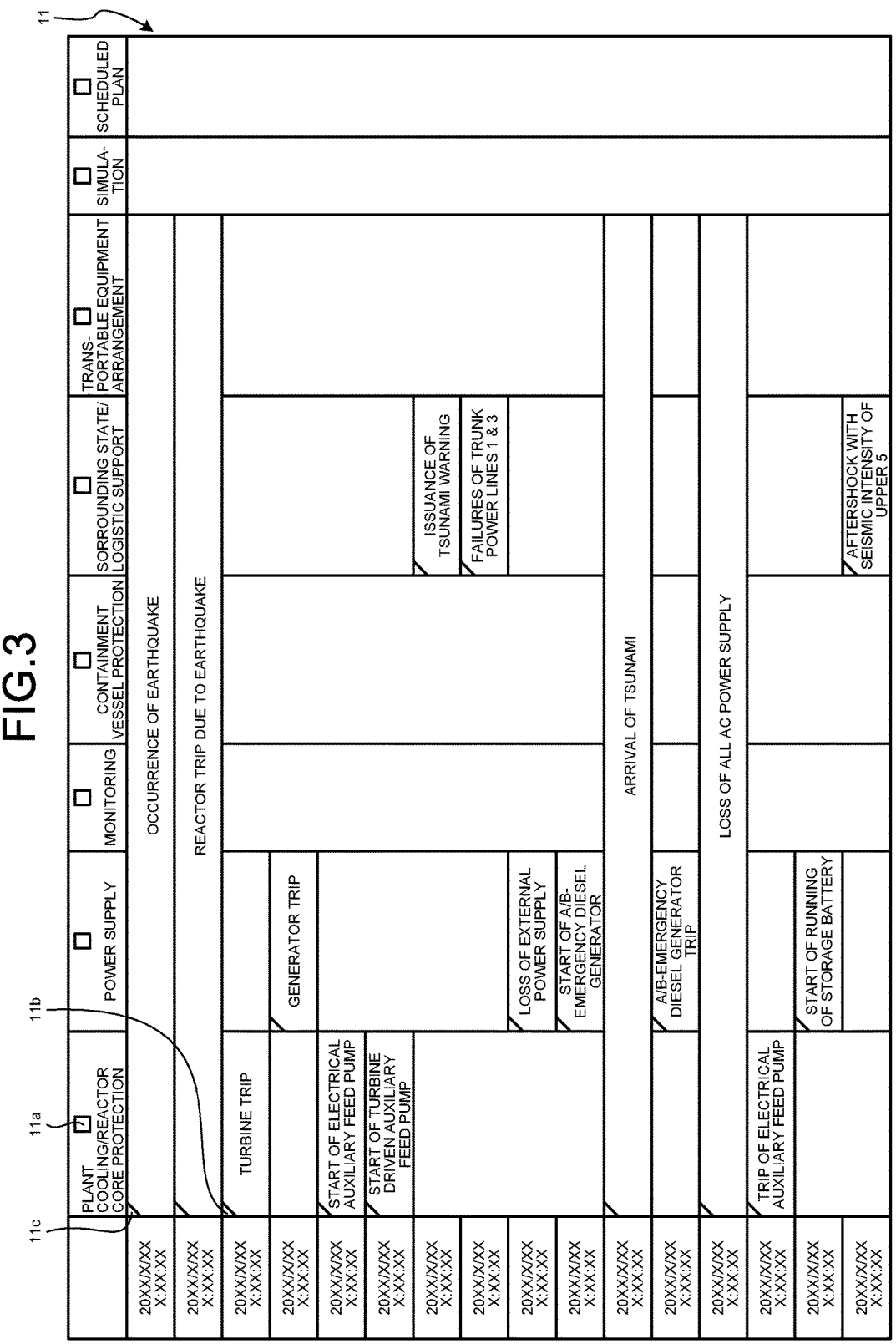
FIG. 3 is a schematic diagram illustrating a display example of the display control device according to the embodiment of the present invention.

FIG. 1 is a schematic configuration diagram illustrating a display control system including a display control device according to an embodiment of the present invention. FIG. 2 is a schematic configuration diagram of an information managing unit in the display control device according to the present embodiment. FIG. 3 is a schematic diagram illustrating a display example of the display control device according to the present embodiment.

A display control system 10 is used as a meeting system. In the present embodiment, the meeting system is exemplified by a decision-making support system at the time of an emergency. The decision-making support system is, for example, a system that is provided in a nuclear power plant (hereinafter, also "plant") and that supports a meeting held for making decisions for various events at the time of an emergency of the nuclear power plant.

As illustrated in FIG. 1, the display control system 10 has a display unit 11, an operation unit 12, an I/F unit 41, an information managing unit 42, and a database 43. The display control system 10 of the present embodiment can also have an input device 44, and an output device 45. When applied as a decision-making support system in a nuclear power plant at the time of an emergency, the display control system 10 of the present embodiment can further include a simulation unit 46. A display control device 40 provided in the display control system 10 has the I/F unit 41 and the information managing unit 42 and can have at least one of the display unit 11, the operation unit 12, the database 43, and the simulation unit 46 as necessary.

The display unit 11 is, for example, a large display that can be viewed by multiple persons involved in a meeting. The operation unit 12 is used to operate displays on the display unit 11 or to input various pieces of information associated with the displays. The operation unit 12 includes a touch panel provided on a screen of the display unit 11 or a mouse and a keyboard connected to the display unit 11.

The I/F unit 41 is configured as an input/output unit and enables input and output of various types of data. Specifically, the input device 44 and the output device 45 are connected to the I/F unit 41. Examples of the input device 44 are a personal computer and a mobile terminal (a tablet terminal). The input device 44 can input information received by a telephone or information received by a fax machine to the I/F unit 41. A plurality of the input devices 44 can be provided. Examples of the output device 45 are a printer device and a mobile terminal (a tablet terminal).

When the display control system 10 is applied as a decision-making support system in a nuclear power plant at the time of an emergency, a plant system 32 is connected to the I/F unit 41 via an emergency-operation-parameter transmitting system 33, and a subsystem 31 is also connected to the I/F unit 41. The plant system 32 manages various data of a reactor (data such as various temperatures and flow rates in the reactor) and inputs the various data of the nuclear power plant to the I/F unit 41 as necessary. The emergency-operation-parameter transmitting system 33 inputs various operation parameters to the I/F unit 41 at the time of an emergency of the plant. The subsystem 31 manages various data (such as meteorological data) other than the data in the nuclear power plant and inputs the various data to the I/F unit 41 as necessary.

The information managing unit 42 is, for example, a computer and is realized by an arithmetic processing device 421, a storage device (a computer program) 422, and the like, as illustrated in FIG. 2. The information managing unit 42 can also have a display device 423, an input device 424, an audio output device 425, a drive device 426, and an input/output interface device 427. The arithmetic processing device 421 includes a microprocessor such as a CPU (Central Processing Unit). The storage device 422 includes a memory and a storage, such as a ROM and a RAM. The arithmetic processing device 421 performs arithmetic processing according to a computer program stored in the storage device 422. The display device 423 includes a flat panel display. The input device 424 generates input data by being operated. The input device 424 includes at least one of a keyboard and a mouse. The input device 424 can include a touch sensor provided on a display screen of the display device 423. The audio output device 425 includes a speaker. The drive device 426 reads data from a recording medium 428 in which data such as a program for implementing the information managing unit 42 is recorded. Various types of recording media, such as a recording medium that optically, electrically, or magnetically records information therein, for example, a CD-ROM, a flexible disk, or a magneto-optical disc, or a semiconductor memory that electrically records information therein, for example, a ROM or a flash memory can be used as the recording medium 428. The input/output interface device 427 provides data communication among the arithmetic processing device 421, the storage device 422, the display device 423, the input device 424, the audio output device 425, and the drive device 426. The information managing unit 42 processes various data input from outside to create display data to be displayed on the display unit 11. The information managing unit 42 switches displays of the display unit 11 based on an operation on the operation unit 12. The information managing unit 42 adds input information to the display data displayed on the display unit 11 and displays resultant data on the display unit 11.

The database 43 has various data input from outside and display data generated by the information managing unit 42 stored therein. Data stored in the database 43 can be taken out by the information managing unit 42.

When the display control system 10 is applied as a decision-making support system in a nuclear power plant at the time of an emergency, the simulation unit 46 performs prediction arithmetic process of temporal changes in the plant based on plant data collected by the information managing unit 42 to generate plant prediction data.

The display control system 10 thus configured is applied as a decision-making support system at the time of an emergency. For example, when a severe accident occurs, a reactor trip signal is first input from the plant system 32. In some cases, the information managing unit 42 then collects necessary plant data from the subsystem 31, the plant system 32, and the emergency-operation-parameter transmitting system 33. In these cases, the information managing unit 42 of the display control device 40 generates display data based on the collected plant data and displays the generated display data on the display unit 11. The information managing unit 42 also causes the simulation unit 46 to generate plant prediction data based on the collected plant data, generates display data based on the plant prediction data, and displays the generated display data on the display unit 11. The information managing unit 42 also generates display data by processing information input from the input device 44 and displays the generated display data on the display unit 11.

When a severe accident occurs in a plant, events changing every moment are grasped and various decisions are made.

In the display control system 10 of the present embodiment, the database 43 records event data input via the I/F unit 41 together with time information related to reports. The event data is data of events changing every moment when a severe accident occurs in a plant. A category is assigned to each of the event data by identification information. The identification information can be assigned, for example, when data is input by the input device 44. Alternatively, the identification information is previously assigned to the event data from the emergency-operation-parameter transmitting system 33, the plant system 32, or the subsystem 31. As illustrated in FIG. 3, the categories are, for example, plant cooling/reactor core protection, a power supply, monitoring, containment vessel protection, surrounding state/logistic support, transportable equipment arrangement, simulation, and a scheduled plan assuming a case where a severe accident occurs. Events are input by the input device 44 for each of the categories and are stored in the database 43.

The information managing unit 42 of the display control device 40 has following functions to efficiently execute display control of event data. As illustrated in FIG. 1, the information managing unit 42 has an acquiring unit 42A, a generating unit 42B, and a display control unit 42C. The acquiring unit 42A and the generating unit 42B constitute a display generating device 39 according to the present embodiment. The acquiring unit 42A acquires multiple pieces of event data, which are pieces of event data at the time of a disaster related to the plant and are each assigned with time information and identification information indicating which one of multiple categories related to the plant the event data belongs to. For example, the acquiring unit 42A acquires event data stored in the database 43. The time information is, for example, a transmission time or a reception time of event data, or a time when an event has occurred. The generating unit 42B generates display data by arraying multiple pieces of event data in time series based on the time information for each of the categories depending on the identification information. For example, the generating unit 42B generates display data by arraying the categories on a horizontal axis and arraying multiple pieces of the event data on a vertical axis for each of the categories in time series based on the time information related to reports. The display control unit 42C executes control to display the display data generated by the generating unit 42B on the display unit 11. For example, the display control unit 42C executes control to display display data on the screen of the display unit 11 as illustrated in FIG. 3. In this case, as illustrated in FIG. 3, the display control unit 42C executes control to color rectangular frames 11a of the respective categories to display the categories by color-coding and to color corner of frames 11b of display data located thereunder with the same colors as those of the rectangular frames 11a to display the respective categories to be associated with each other.

Because event data such as occurrence of an earthquake, a reactor trip due to an earthquake, arrival of tsunami, or loss of all AC power supply is common to all of the categories in the plant in FIG. 3, the information managing unit 42 generates display data extending across the categories and displays the generated display data on the display unit 11. In this case, as illustrated in FIG. 3, corner of frames 11c of the display data extending across the categories are colored with a color different from those of the respective categories to display the common event data by color coding. This display method is merely an example. The shapes of the frames can be changed or icons can be added thereto to provide different distinctive displays.

Although not illustrated in FIG. 3, when there are pieces of event data common to the multiple categories, the information managing unit 42 can extract the pieces of common event data to be classified into a different category, array the pieces of event data in time series in this different category to generate display data, and display the generated display data on the display unit 11.

The event data can be stored in the database 43 in a state where whether to display the data on the display unit 11 is preset by the identification information. The information managing unit 42 can acquire only the preset event data, array the acquired event data in time series for each of the categories to generate display data, and display the generated display data on the display unit 11.

Alternatively, the event data can be stored in the database 43 in a state where an importance degree is preset by the identification information. As for event data with a low importance degree, the information managing unit 42 can generate display data aggregated as time passes and display the generated data on the display unit 11. Aggregation of display data is performed to aggregate displays into one, for example, in units of one week, in units of one month, in units of a half year, or in units of one year, and the individual displays can be confirmed by selecting this aggregated display using the operation unit 12. Meanwhile, the information managing unit 42 can display event data with a high importance degree on the display unit 11 without being aggregated.

In the database 43, stored event data may be changed (for example, there is a case where an input error is found and corrected). In this case, the information managing unit 42 can generate display data in a mode in which display data reflecting the change is added to previously-generated display data and can display the resultant display data on the display unit 11.

Furthermore, as described above, when the display control system 10 is applied as a decision-making support system in a nuclear power plant at the time of an emergency, the simulation unit 46 performs prediction arithmetic process of temporal changes of the plant based on the plant data collected by the information managing unit 42 to generate plant prediction data. Therefore, in the present embodiment, the plant prediction data of the simulation unit 46 is stored in the database 43 as prediction data that predicts subsequent events. The information managing unit 42 can generate display data in which the prediction data of predicted events are arranged in time series in the category of the prediction data of the predicted events, and display the generated display data on the display unit 11.

The display control system 10 of the present embodiment also generates display data from a previously planned schedule other than data from a simulator and displays the generated display data on the display unit 11. That is, in the present embodiment, when a previously planned schedule is input to the input device 44, the schedule is stored in the database 43 as plan data. The information managing unit 42 can generate display data by arraying the plan data in the category of the plan data of events of the scheduled plan in time series and can display the generated display data on the display unit 11.

Figure 4:
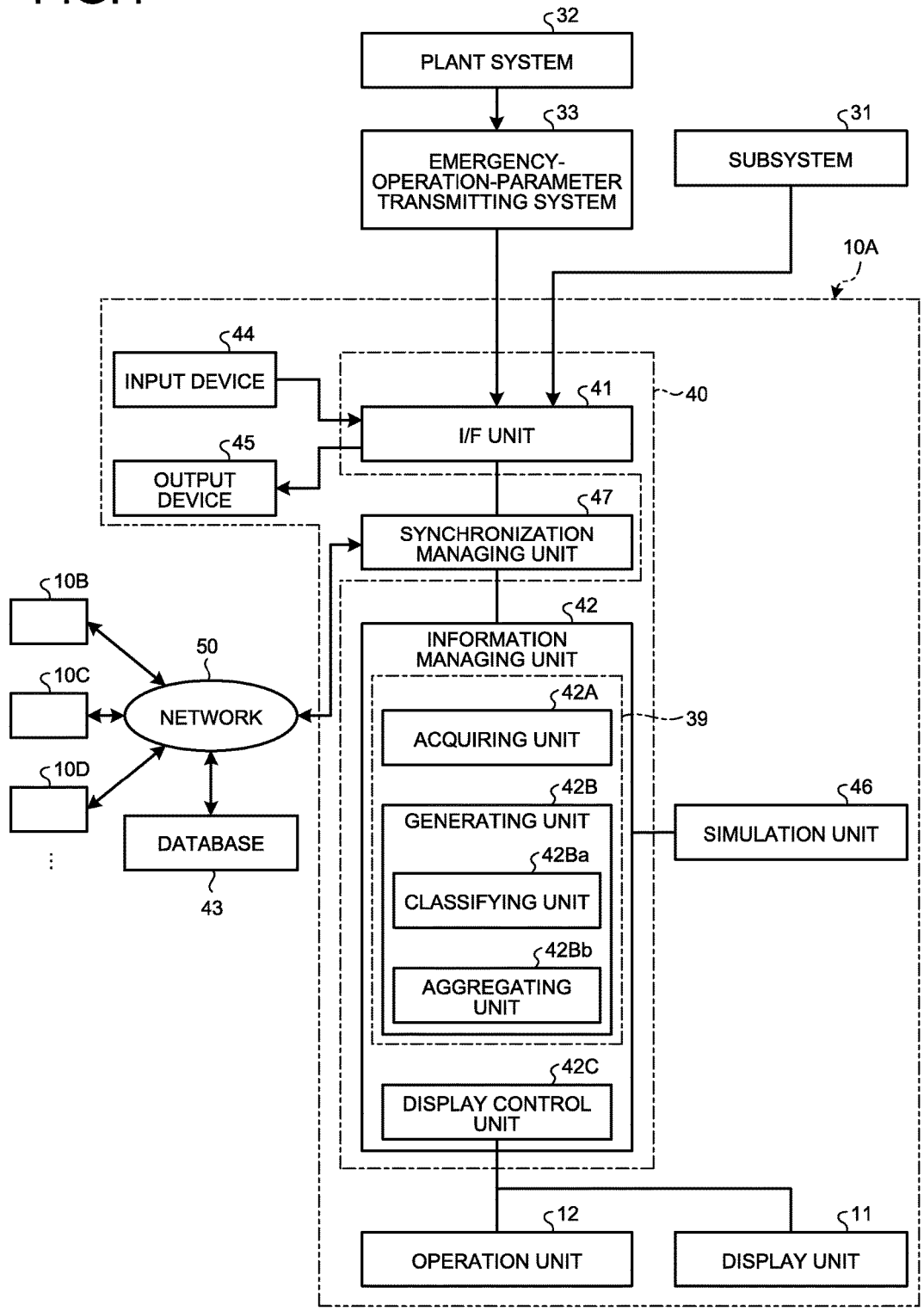
FIG. 4 is a schematic configuration diagram illustrating a display control system including another display control device according to the embodiment of the present invention.

FIG. 4 is a schematic configuration diagram illustrating another display control system 10 according to the present embodiment. The embodiment illustrated in FIG. 4 is different from the embodiment described above in that there are multiple identical display control systems denoted by signs 10A, 10B, 10C, 10D, . . . and these display control systems 10A, 10B, 10C, 10D, . . . are connected with each other to enable various types of data to be mutually transmitted or received via a network 50 (hereinafter, "network") that is used at the time of a comprehensive disaster related to a reactor. Other configurations are identical. Therefore, in the descriptions related to FIG. 4, constituent elements identical to those in the embodiment described above are denoted by like reference signs and descriptions thereof are omitted.

The display control systems 10A, 10B, 10C, 10D, . . . are used as decision-making support systems at the time of an emergency in a nuclear power plant and are provided in a nuclear power plant, an electric power company, a local government, the government (a government policy agency, a regulation authority, and an off-site center), and a plant manufacturer, respectively.

Each of the display control systems 10A, 10B, 10C, 10D, . . . has a synchronization managing unit 47. The synchronization managing unit 47 is located between the I/F unit 41 and the information managing unit 42 and is connected thereto. The synchronization managing unit 47 is also connected to the network 50 to share information with other decision-making support systems. For example, the synchronization managing unit 47 transmits or receives various data via the network 50 and updates the data. When the network 50 is disconnected and the network 50 is reconnected after a lapse of a predetermined period, the synchronization managing unit 47 updates data based on data received from other decision-making support systems. That is, the display control systems 10A, 10B, 10C, 10D, . . . are configured to be capable of sharing various types of information by being connected to the network 50. While databases 43 can be connected to the display control systems 10A, 10B, 10C, 10D, . . . , respectively, a single database 43 can be connected to the network 50 to configure the display control systems 10A, 10B, 10C, 10D, . . . to be capable of sharing various types of information via the network 50 as illustrated in FIG. 4.

The information managing unit 42 can generate display data based on emergency information required at the time of an emergency and can share the emergency information via the network 50. The emergency information is, for example, as described below.

1. Personnel resource management information—input using the input device 44
2. Logistics support (goods transportation) information —input using the input device 44
3. Radiation monitoring (surroundings, in the plant, and in the building) information—input from monitoring posts via the network 50
4. Meteorological information, wind direction information, earthquake information, tsunami information—input via the network 50
5. Damage status information in the plant (camera images, landslides, restoration status)—input using the input device 44
6. Plant reactor core information (fuel temperature, reactor core temperature, reactor core pressure, and the like)—input from the emergency-operation-parameter transmitting system 33
7. Prediction information of plant status in progress —input from the simulation unit 46
8. Electric power transmission information around the plant—input from the electric power company via the network 50
9. Response status information in the plant (status of the transportable equipment)—input using the input device 44
10. Information on documents obliged to be kept, such as reactor design drawings—input from the database 43 via the network 50
11. Task management information—input using the input device 44
12 FAX image information and the like—input using the input device 44

The information managing unit 42 selects only information required for making decisions among pieces of the emergency information to generate display data, and shares the display data with other display control systems via the network 50. That is, because the display control systems 10A, 10B, 10C, 10D, . . . applied as display control systems at the time of an emergency are provided at different positions in various places such as a nuclear power plant, an electric power company, the local government, the government, and a plant manufacturer, pieces of emergency information required thereby are also different. Accordingly, the display control systems 10A, 10B, 10C, 10D, . . . previously assign degrees of priority to the emergency information and select only information with a high degree of priority to be displayed.

In this case, information required for making decisions and selected by the information managing unit 42 includes latest information including real-time information. That is, while various types of emergency information are input from the input device 44, the operation unit 12, or the network 50 to the information managing unit 42 as needed, these various types of emergency information are stored in the database 43 with date and time, and the latest information is always displayed. The real-time information includes reactor core information (a fuel temperature, a reactor core temperature, a reactor core pressure, and the like) in the plant input from the emergency-operation-parameter transmitting system 33, radiation monitoring information (surroundings, in the plant, and in the building) input via the network 50, and the like.

The information required for making decisions and selected by the information managing unit 42 includes information satisfying a predetermined priority display standard and display data based on this information is preferentially displayed on the display unit 11. The priority display standard is information with a high degree of risk or a high degree of importance. This information is preferentially displayed, for example, when change rates of the fuel temperature, the reactor core temperature, and the reactor core pressure exceed respective preset standard values in the plant. This information is preferentially displayed also when a meteorological status such as a rainfall amount, a wind speed, or a seismic intensity greatly changes. This information is preferentially displayed also when an air dose rate which is a part of information of radiation monitoring (surroundings, in the plant, or in the building) exceeds a preset standard value. Furthermore, information from a preset direction agency (the government, for example) is preferentially displayed.

When information satisfying the predetermined priority display standard is to be displayed on the display unit 11, the information managing unit 42 emphasizes the information (for example, pops up the display itself) on the display unit 11 according to the priority level (the importance degree).

The information managing unit 42 displays the selected information required for making decisions as display data on the display unit 11, where emergency information stored in the database 43 is organized for each of items of countermeasures. The items of countermeasures are, for example, as described below.
1. Evacuation timing
2. Evacuation route
3. Evacuation area
4. Work procedure
5. Personnel positioning
6. Worker route
7. Power supply route
8. Types and amount of transportation goods While the database 43 has many pieces of emergency information stored therein, the information managing unit 42 displays only required pieces of emergency information for deciding items of respective countermeasures from the many pieces of emergency information stored in the database 43 as display data on the display unit 11.

The information required for making decisions and selected by the information managing unit 42 includes prediction data generated by the information managing unit 42 that performs prediction arithmetic process of temporal changes based on the emergency information. The simulation unit 46 generates plant prediction data by performing prediction arithmetic process of temporal changes of the plant based on the plant data collected by the information managing unit 42. The information managing unit 42 can display the plant prediction data obtained by the prediction arithmetic process of the simulation unit 46.

When a severe accident occurs in the display control system 10A, the information managing unit 42 collects necessary plant data (emergency information) from the plant system 32 and also collects various types of emergency information from the network 50. The information managing unit 42 generates display data based on the collected various types of emergency information and the display unit 11 displays the generated display data. The information managing unit 42 also generates display data by processing information input from the input device 44 and the display unit 11 displays the generated display data.

When a severe accident occurs in the display control system 10A used as a decision-making support system at the time of an emergency in a nuclear power plant, the information managing unit 42 acquires various event data stored in the database 43 via the network 50. The information managing unit 42 generates display data by arraying the event data stored in the database 43 in time series for each of the categories and displays the generated display data on the display unit 11.

In this way, the display generating device 39 applied to the display control system 10 (10A, 10B, 10C, 10D, . . . ) of the present embodiment includes the acquiring unit 42A that acquires multiple pieces of event data with time information and identification information indicating which one of multiple categories related to the facility the event data belongs to, and the generating unit 42B that generates display data where the multiple pieces of event data are arrayed in time series based on the time information for each of the categories depending on the identification information. The display control device 40 includes the display generating device 39, and the display control unit 42C that executes control to display the display data on the display unit 11.

Figure 5:
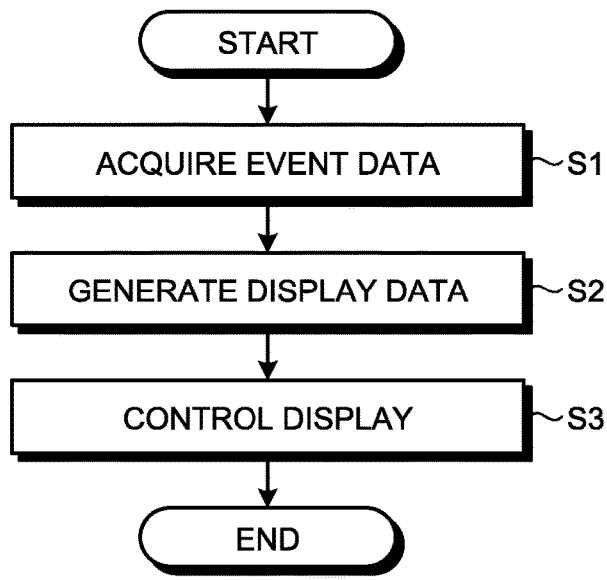
FIG. 5 is a flowchart illustrating an example of a display generating method according to the embodiment of the present invention.

That is, as illustrated in a flowchart of FIG. 5, the display generating device 39 performs a display generating method including acquiring multiple pieces of event data with time information and identification information indicating which one of the categories related to the facility the event data belongs to, in the acquiring unit 42A (Step S1: event-data acquiring process), and generating display data by arraying multiple pieces of event data in time series based on the time information for each of the categories depending on the identification information in the generating unit 42B (Step S2: display-data generating process). The display control device 40 performs the display generating method further including executing control to display the display data on the display unit 11 in the display control unit 42C (Step S3: display control process).

With the display generating device 39, the display control device 40, and the display generating method, pieces of event data of various events are acquired and display data where the pieces of event data are arrayed in time series for each of the categories is generated to be displayed on the display unit 11. Therefore, reports on the various events can be aggregated. Accordingly, an operator can confirm the various events in time series with respect to each category. As a result, the event data of the various events can be managed in a lump and can be presented to the operator with no omission.

In the display generating device 39, when a piece of event data is common to multiple categories, it is preferable that the generating unit 42B generates display data in such a manner that the piece of event data extends across the categories.

Figure 6:
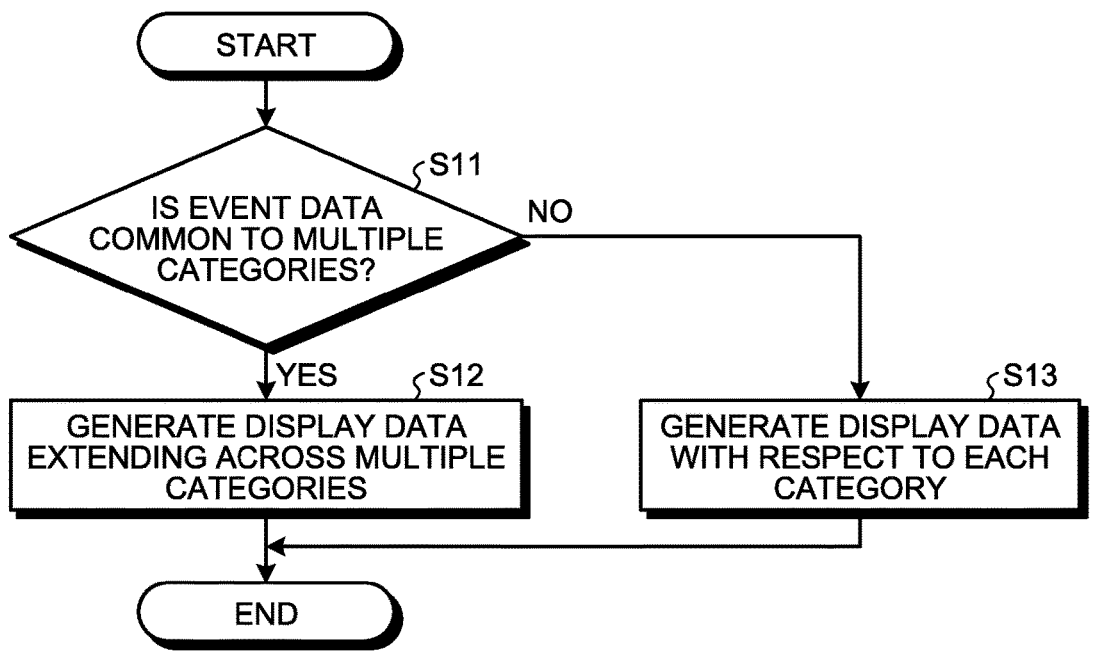
FIG. 6 is a flowchart illustrating an example of the display generating method according to the embodiment of the present invention.

That is, as illustrated in a flowchart of FIG. 6, when a piece of event data is common to multiple categories in the acquisition unit 42A (YES at Step S11), the display generating device 39 generates display data extending across the categories (Step S12). On the other hand, when a piece of event data is not common to multiple categories (NO at Step S11), the display generating device 39 generates display data with respect to each category (Step S13).

With the display generating device 39, pieces of event data common to multiple categories are displayed as display data extending across the categories, so that the visibility is enhanced and report contents can be emphasized as compared to a case where the pieces of event data are displayed as individual pieces of display data.

Furthermore, in the display generating device 39, when pieces of the event data are common to multiple categories, it is preferable that the generating unit 42B generates display data by aggregating the pieces of event data into a common category.

Figure 7:
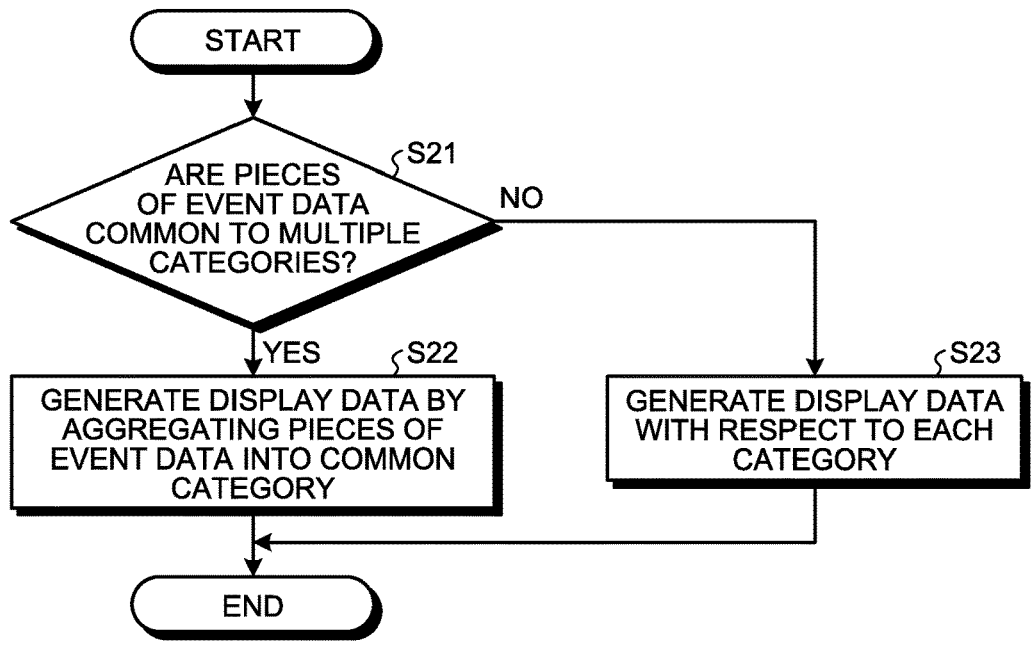
FIG. 7 is a flowchart illustrating an example of the display generating method according to the embodiment of the present invention.

That is, as illustrated in a flowchart of FIG. 7, when pieces of event data are common to multiple categories in the acquiring unit 42A (YES at Step S21), the display generating device 39 generates display data by aggregating the pieces of event data into a common category (Step S22). On the other hand, when pieces of event data are not common to multiple categories (NO at Step S21), the display generating device 39 generates display data with respect to each of the categories (Step S23).

With the display generating device 39, when there are pieces of event data common to multiple categories, display data is generated by aggregating these pieces of event data into another category, so that these pieces of event data can be seen from a different viewpoint and report contents can be emphasized.

In this case, the display generating device 39 generates the display data in such a manner that the corner of the frame 11b of display data extending across multiple categories is displayed in a different color from those of the multiple categories. Therefore, when display data extending across the categories is generated, the display data is generated with the corner of the frame 11b of the display data extending across the categories being colored with a different color from those of the respective categories, so that common event data can be displayed distinctively by being separately color-coded.

Furthermore, in the display generating device 39 of the present embodiment, it is preferable that the acquiring unit 42A acquire only preset event data.

According to the display generating device 39, when there are many reports, display data generated from preset event data, for example, event data with a high importance degree is displayed on the display unit 11, so that the visibility can be improved and report contents can be emphasized.

The display generating device 39 in the information managing unit 42 includes a classifying unit 42Ba and an aggregating unit 42Bb in the generating unit 42B as illustrated in FIGS. 1 and 4. The classifying unit 42Ba divides multiple pieces of event data into at least two groups based on a predetermined standard. The aggregating unit 42Bb aggregates pieces of event data included in a specific one of the at least two classified groups into one unit as time passes.

Figure 8:
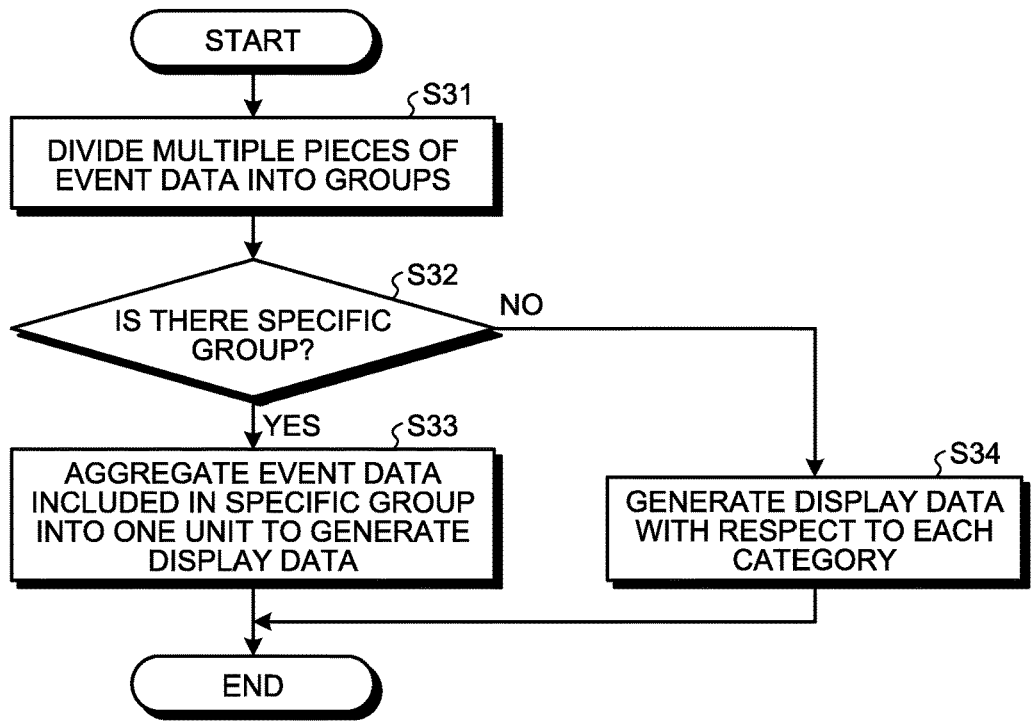
FIG. 8 is a flowchart illustrating an example of the display generating method according to the embodiment of the present invention.

That is, as illustrated in a flowchart of FIG. 8, the display generating device 39 divides multiple pieces of event data into at least two groups based on a predetermined standard in the classifying unit 42Ba of the generating unit 42B (Step S31). When there is a specific group (YES at Step S32), the aggregating unit 42Bb aggregates pieces of event data included in the specific group into one unit to generate display data (Step S33). On the other hand, when there is no specific group (NO at Step S32), the aggregating unit 42Bb generates display data with respect to each category (Step S34).

For example, in the display generating device 39, importance degrees are preset as predetermined standards to the event data, respectively, and the classifying unit 42Ba classifies the event data into a group of event data with a low importance degree and a group of event data with a high importance degree. As for pieces of the event data with a low importance degree, the aggregating unit 42Bb generates display data where the pieces of the event data are aggregated as time passes and displays the generated display data on the display unit 11. Meanwhile, pieces of the event data with a high importance degree are displayed on the display unit 11 without being aggregated.

According to the display generating device 39, pieces of event data with a low importance degree are aggregated as the time passes and are displayed in a compact state while pieces of event data with a high importance degree are displayed as they are. Therefore, the visibility is enhanced and report contents with a high importance degree can be emphasized.

Furthermore, in the display generating device 39, when the acquiring unit 42A acquires updated event data, it is preferable that the generating unit 42B generate display data based on the updated event data.

When event data is input manually, erroneous inputs may occur. With the display control device 40, when an erroneous input is corrected and data is updated to be stored in the database 43, the updated event data is acquired and display data reflecting the update is generated, so that correct report contents can be displayed.

In the display generating device 39, when the acquiring unit 42A acquires event data of predicted subsequent events, it is preferable that the generating unit 42B generates display data based on the predicted event data.

According to the display generating device 39, for example, when subsequent events are predicted by simulation and these subsequent events are stored as event data in the database 43, the event data of the predicted subsequent events is acquired and display data predicting the subsequent events is generated, whereby prediction of the subsequent events can be seen in time series.

In the display generating device 39, when the acquiring unit 42A acquires previously-scheduled plan data, it is preferable that the generating unit 42B generates display data based on the plan data.

Figure 9:
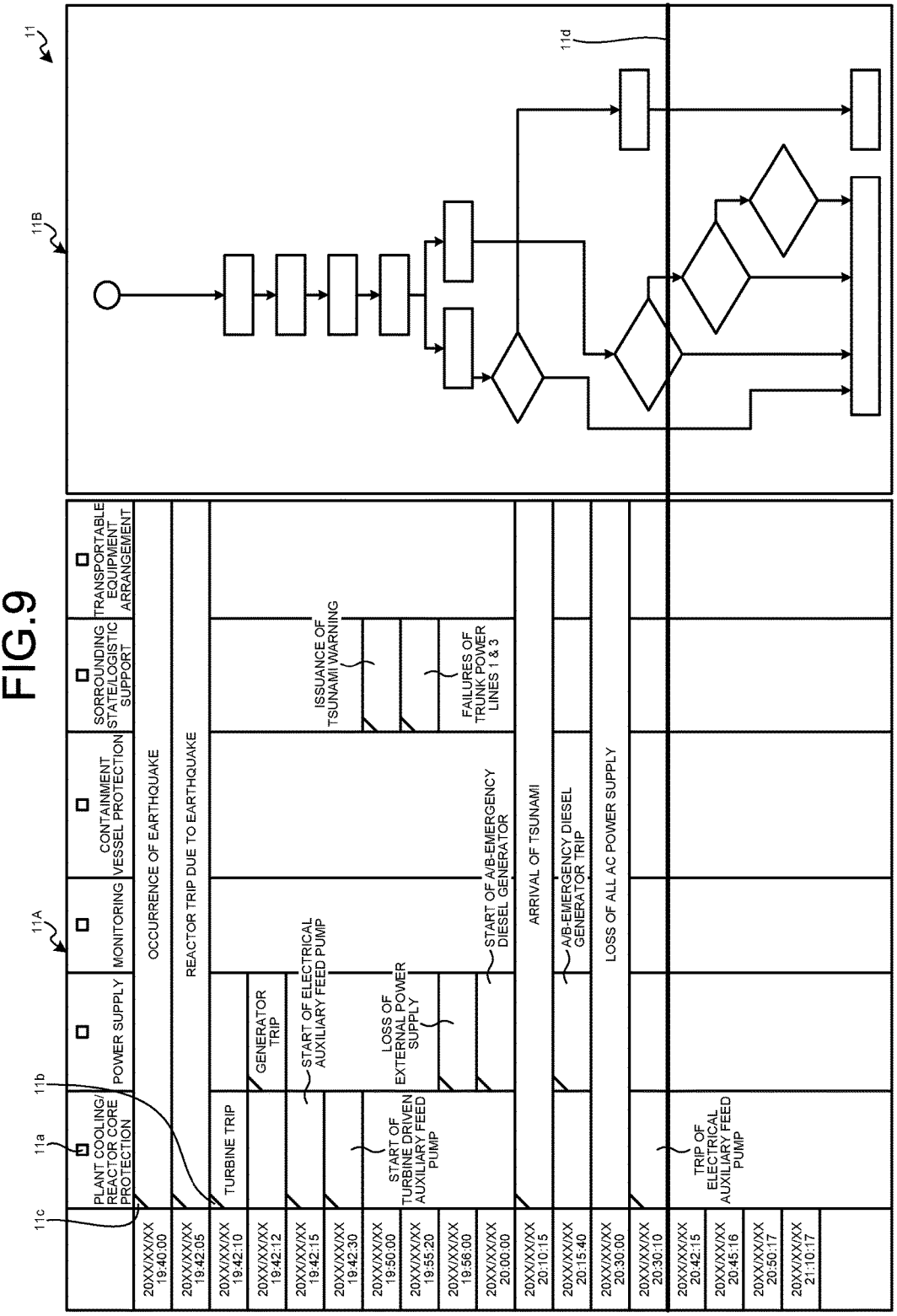
FIG. 9 is a schematic diagram illustrating a display example of the display control device according to the embodiment of the present invention.
Figure 10:
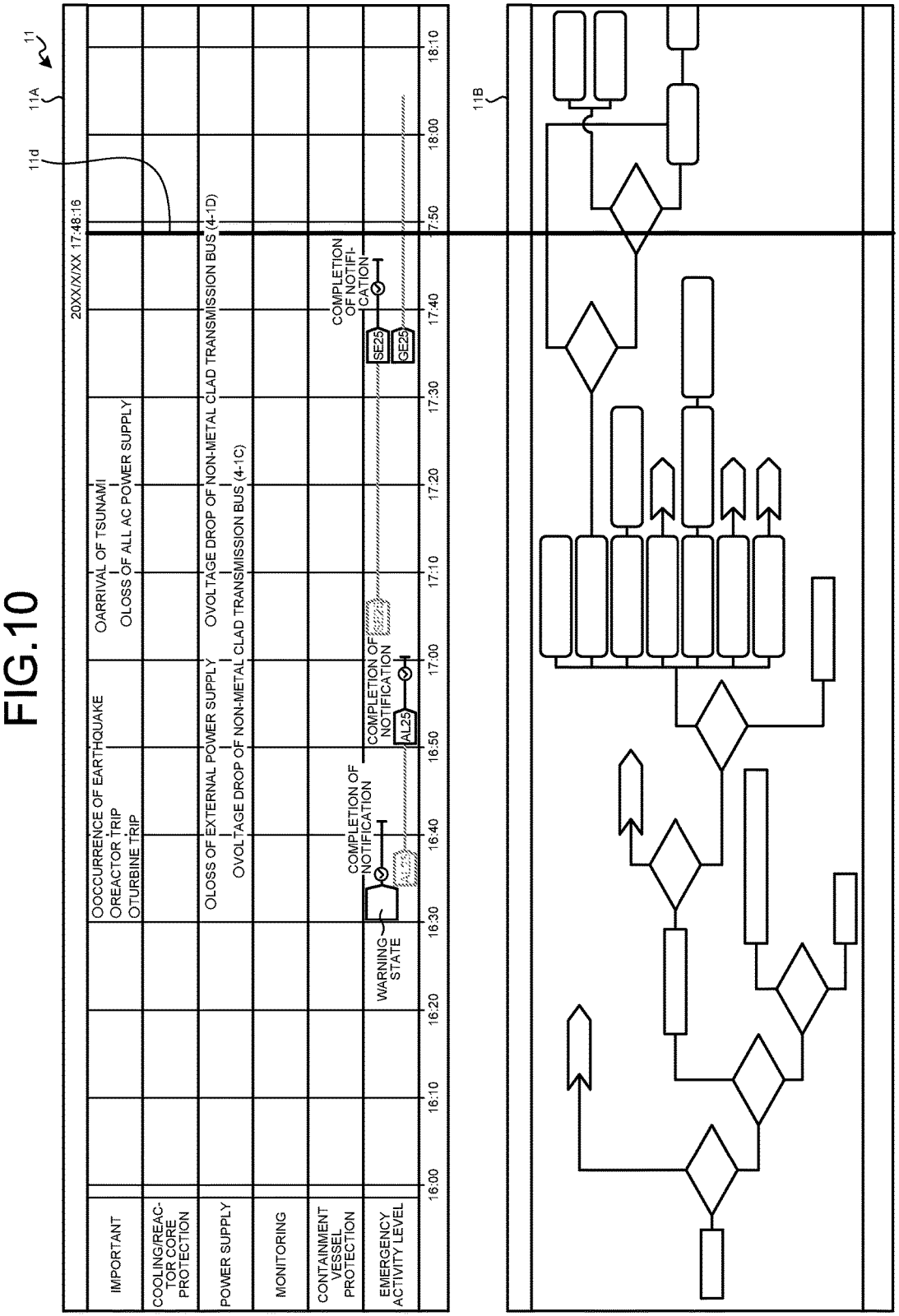
FIG. 10 is a schematic diagram illustrating a display example of the display control device according to the embodiment of the present invention.

FIGS. 9 and 10 are schematic diagrams illustrating display examples of the display control device according to the present embodiment. For example, plan data indicates a plan that is handled hereafter and obtained by analysis or the like, and the plan data is previously stored in the database 43. A display of the plan data can be displayed in a form of a flowchart as denoted by a sign 11B in FIGS. 9 and 10. In this case, the generating unit 42B displays data including the past event data in time series and can display the past event data and the plan data previously scheduled in a state being split by a section line 11d indicating the present time. The display 11B of the plan data can be displayed along with a display of the event data illustrated in FIG. 3, as denoted by a sign 11A in FIGS. 9 and 10. FIG. 9 illustrates an example in which the display 11A and the display 11B are displayed side by side in a horizontal direction, and respective pieces of data are displayed in time series from top to bottom on a vertical axis and are split by the section line 11d indicating the present time both in the displays 11A and 11B. FIG. 10 illustrates an example in which the display 11A and the display 11B are displayed along with each other in vertically, and respective pieces of data are displayed in time series from left to right on the horizontal axis and are split by the section line 11d indicating the present time both in the displays 11A and display 11B.

According to the display control device 40, deviation from the current progress can be recognized, items (works) to be handled hereafter can be known, and allowable time therefor can be recognized at a glance. A planned schedule can be revised by new analysis or drill according to actual handling and can be stored in the database 43. Accordingly, the planned schedule becomes a plan with higher accuracy as the schedule is implemented more. Furthermore, the plan is defined with respect to each event and the planned schedule to be displayed can be changed in conjunction with prediction of a simulator.

In the display generating device 39, when the acquiring unit 42A acquires work data of works corresponding to event data, it is preferable that the generating unit 42B generates display data based on the work data.

Figure 11:
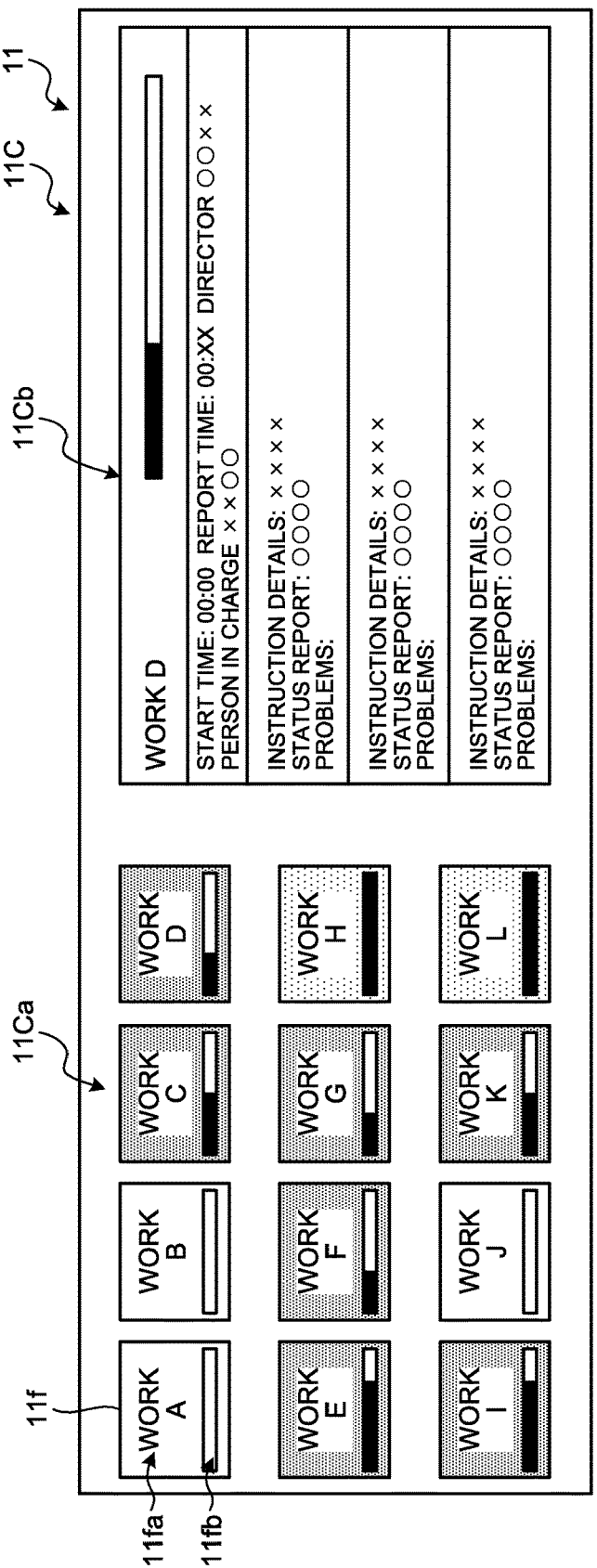
FIG. 11 is a schematic diagram illustrating a display example of the display control device according to the embodiment of the present invention.

FIG. 11 is a schematic diagram illustrating a display example of the display control device according to the present embodiment. For example, as work data, work data indicating contents of works to be performed for countermeasures of events based on the event data illustrated in FIG. 3 is previously stored in the database 43. The display control device 40 displays multiple icons (tiles) 11*f* in a left region on the display unit 11 as illustrated in FIG. 11. The icons 11*f* include work data 11*fa* (a work A, a work B, a work C, a work D, a work E, a work F, a work G, a work H, a work I, a work J, a work K, and a work L) indicating contents of works, and progress data 11*fb* of the works, respectively.

In FIG. 11, the display control device 40 displays 12 icons 11*f* including work data that indicates the contents of 12 works (the work A, the work B, the work C, the work D, the work E, the work F, the work G, the work H, the work I, the work J, the work K, and the work L), respectively.

In FIG. 11, the display control device 40 displays the progress data 11*fb* with a bar. The progress data 11*fb* indicates progress status of the corresponding work and, for example, is input by the input device 44. The progress data 11*fb* can be acquired from the plant system 32 by various sensors provided in the plant. The progress data 11*fb* is supplied to the information managing unit 42 via the I/F unit 41. The progress data 11*fb* can be stored in the database 43.

The generating unit 42B of the display generating device 39 in the information managing unit 42 generates work data 11*fa* of a work that has not been performed yet, work data 11*fa* of a work that is being performed, and work data 11*fa* of a work that has been completed to have different designs, respectively. In the example illustrated in FIG. 11, the generating unit 42B differentiates the respective pieces of work data 11*fa* by changing colors of the corresponding icons 11*f*. For example, the works A, B, and J are work data 11*fa* of works that have not been performed yet and the corresponding icons 11*f* are not colored. The works C, D, E, F, G, I, and K are work data 11*fa* of works that are being performed and the corresponding icons 11*f* are colored in red. The works H and L are work data 11*fa* of works that have been completed and the corresponding icons 11*f* are colored in blue.

The display control device 40 can display detailed data 11Cb of one of the multiple works in a right region on the display unit 11 as illustrated in FIG. 11. In the example illustrated in FIG. 11, the detailed data 11Cb of the work D is displayed. As the detailed data 11Cb, reports from workers are input to the input device 44. As the detailed data 11Cb, for example, data related to a start time of the work D, a report time when reports from workers were performed, contents of the reports, directors, and reporters are displayed. Furthermore, data indicating a scheduled end time can be displayed as the detailed data 11Cb when a report indicating that the work D has ended was input.

A display 11C including the work data illustrated in FIG. 11 can be displayed with the displays 11A and 11B illustrated in FIGS. 9 and 10. According to the display control device 40, works of countermeasures for event data can be confirmed.

In the display generating device 39, it is preferable that pieces of event data at multiple places be stored in the database 43 via the network 50.

With the display generating device 39, pieces of event data at multiple places are acquired, and display data where the pieces of event data are arrayed in time series for each of the categories is generated and displayed on the display unit 11, so that the event data at multiple places can be collectively displayed.

In the embodiment described above, the display control systems 10 (10A, 10B, 10C, 10D, . . . ) are applied to a plant. The display control systems 10 (10A, 10B, 10C, 10D, . . . ) can alternatively be applied to various application targets, for example, traffic facilities such as highways or railways, or building facilities such as condominium facilities or commercial facilities, as well as the plant.

FIG. 12 is a schematic diagram illustrating a display example of the display control device according to the present embodiment. In FIG. 12 in the present embodiment, an example in which the display control systems 10 (10A, 10B, 10C, 10D, . . . ) are applied to traffic monitoring facilities on a highway is illustrated. That is, in the display generating device 39 of the information managing unit 42 in the display control device 40 described above, the acquiring unit 42A acquires event data such as a traffic congestion, an accident, a closure, a roadblock, an accident handling, and a natural disaster such as strong wind on the highway as illustrated in FIG. 12. The generating unit 42B generates display data, for example, by arraying categories on the horizontal axis and arraying the event data in time series on the vertical axis for each of the categories based on time information related to reports. The display control unit 42C executes control to display the display data generated by the generating unit 42B on the display unit 11. For example, the display control unit 42C executes control to display the display data on the screen of the display unit 11 as illustrated in FIG. 12. In this case, the display control unit 42C executes control to color rectangular frames 11*g* of the categories to color-code the categories, and to color corners of frames 11*h* of display data under each of the categories with the same color as the color of the corresponding category to associate displays in the respective categories with each other as illustrated in FIG. 12. Because event data such as issuance of a strong wind warning is common to all the categories of the highway in FIG. 12, the information managing unit 42 generates display data extending across the categories and displays the generated display data on the display unit 11. In this case, as illustrated in FIG. 12, a corner of a frame 11*i* of the display data extending across the categories is colored with a different color from those of the respective categories to display the common event data to be distinguished by the color. This display method is merely an example. The shape of the frame can be changed or an icon can be added thereto to provide a different distinctive display. Although not illustrated in FIG. 12, also when the display control systems 10 (10A, 10B, 10C, 10D, . . . ) are applied to traffic monitoring facilities on a highway, the plan data illustrated in FIGS. 9 and 10 or the work data illustrated in FIG. 11 can also be displayed.

Regarding a program executed by the information managing unit 42 as practical hardware, the arithmetic processing device 421 reads a program from the ROM of the storage device 422 and executes the program, whereby one unit or multiple units among the constituent units described above are loaded on the RAM of the storage device 422 to generate the unit or the multiple units on the RAM of the storage device 422. In this way, the processing described in the above embodiment can be realized as a program that is executed by a computer. The processing described above can be realized by installing this program from a server or the like and making the computer execute the program. The processing described above can also be realized by recording this program on the storage medium 428 and making the computer read the program from the storage medium 428 on which the program is recorded. While embodiments have been described above, the present invention is not limited to the embodiments described above and various modifications and changes may be made within the scope of the claims, other than the embodiments described above.

Although this application has been described with respect to specific embodiments for a complete and clear application, the appended claims are not to be thus limited but are to be construed as embodying all modifications and alternative constructions that may occur to one skilled in the art that fairly fall within the basic teaching herein set forth.

The invention claimed is:

1. A display generating device comprising:
   a processor; and
   a memory having computer-readable instructions stored thereon that, when executed by the processor, cause the display generating device to:
   acquire multiple pieces of event data, each of which being provided with time information and identification information indicating which one of multiple categories related to a facility the event data belongs to; and
   generate display data by arraying the multiple pieces of the event data including the past event data acquired in time series based on the time information for each of the categories depending on the identification information;
   divide the multiple pieces of the event data into at least two groups based on a predetermined standard; and
   aggregate pieces of the event data included in a specific one of the at least two classified groups into one unit as time passes.

2. The display generating device according to claim 1, wherein the display generating device is further caused to:
   generate the display data in such a manner that the piece of the event data extends across the multiple categories when one piece of the event data is common to the multiple categories.

3. The display generating device according to claim 2, wherein the display generating device is further caused to:
   generate the display data in such a manner that the display data is displayed where a corner of a frame of the display data extending across the multiple categories is colored with a different color from those of the multiple categories.

4. The display generating device according to claim 1, wherein the display generating device is further caused to:
   generate the display data by aggregating the respective pieces of the event data in a common category when pieces of the event data are common to the multiple categories.

5. The display generating device according to claim 1, wherein the display generating device is further caused to:
   acquire only preset pieces of the event data.

6. The display generating device according to claim 1, wherein the display generating device is further caused to:
   generate the display data based on the updated event data when the acquiring unit acquires updated event data.

7. The display generating device according to claim 1, wherein the display generating device is further caused to:
   generate the display data based on prediction data when prediction data predicting a subsequent event is acquired.

8. The display generating device according to claim 1, wherein the display generating device is further caused to:
   generate the display data based on plan data when previously scheduled plan data is acquired.

9. The display generating device according to claim 8, wherein the display generating device is further caused to:
   generate the display data in which the past event data and the plan data are split by a section line which indicates a current time.

10. The display generating device according to claim 1, wherein the display generating device is further caused to:
    generate the display data based on work data when work data of a work corresponding to the event data is acquired.

11. The display generating device according to claim 1, wherein the display generating device is further caused to:
    acquire the event data from multiple places via a network.

12. The display generating device according to claim 1, wherein the display control device is further caused to:
    cause the display data generated by the display generating device to be output by a display.

13. The display control device according to claim 12, wherein the display control device is further caused to:
    cause the categories to be displayed in an array on a horizontal axis; and
    cause the display data to be displayed on a vertical axis in time series based on the time information for each of the categories on the display.

14. A display generating method comprising:
    acquiring multiple pieces of event data, each of which being provided with time information and identification information indicating which one of multiple categories related to a facility the event data belongs to;
    generating display data by arraying the multiple pieces of the event data including the past event data acquired in time series based on the time information for each of the categories depending on the identification information;
    dividing the multiple pieces of the event data into at least two groups based on a predetermined standard; and
    aggregating pieces of the event data included in a specific one of the at least two classified groups into one unit as time passes.

* * * * *